May 15, 1962 J. B. STRINGER 3,034,722

MULTIPLIERS FOR ELECTRICAL DIGITAL COMPUTING ENGINES

Filed Aug. 11, 1958 3 Sheets-Sheet 1

JOHN BENTLEY STRINGER
*Inventor*
By Cushman, Darby & Cushman
*Attorneys*

May 15, 1962 J. B. STRINGER 3,034,722

MULTIPLIERS FOR ELECTRICAL DIGITAL COMPUTING ENGINES

Filed Aug. 11, 1958 3 Sheets-Sheet 2

Inventor
John Bentley Stringer
By Cushman, Darby & Cushman
Attorneys

May 15, 1962 J. B. STRINGER 3,034,722

MULTIPLIERS FOR ELECTRICAL DIGITAL COMPUTING ENGINES

Filed Aug. 11, 1958 3 Sheets-Sheet 3

JOHN BENTLEY STRINGER
Inventor
By Cushman, Darby & Cushman
Attorneys

United States Patent Office 3,034,722

Patented May 15, 1962

3,034,722

MULTIPLIERS FOR ELECTRICAL DIGITAL COMPUTING ENGINES

John Bentley Stringer, Hanworth, England, assignor to National Research Development Corporation, London, England, a corporation of Great Britain Filed Aug. 11, 1958, Ser. No. 754,230
Claims priority, application Great Britain Aug. 13, 1957
3 Claims. (Cl. 235—164)

The present invention relates to electrical digital computing engines.

An object of the present invention is to provide a multiplier for such a digital computing engine which combines speed with economy of equipment.

The process of multiplication itself in the binary scale will first be considered. To fix ideas it will be assumed that the multiplier and multiplicand are each 48-digit numbers and for simplicity the question of sign will be ignored for the present.

Suppose it is required to multiply together two positive numbers M and N. We define $m_i$ and $n_i$ to be the $i$th binary digits of M and N, $m_1$ and $n_1$ being the least significant and there being 48 binary digits in each number (a number of the more significant digits of a number being zero in the case when that number is less than $2^{48}-1$). The product P of the two numbers may be regarded as a 96-digit number of which any number of the more significant digits may be zeros. If the number M be regarded as the multiplier and the number N as the multiplicand then the product P may be formed in the following steps:

$$X_1=\tfrac{1}{2}m_1N$$
$$X_2=\tfrac{1}{2}(m_2N+X_1)=2^{-2}(2m_2+m_1)N$$
$$X_3=\tfrac{1}{2}(m_3N+X_2)=2^{-3}(4m_3+2m_2+m_1)N$$
$$\cdots\cdots$$
$$X_i=\tfrac{1}{2}(m_iN+X_{i-1})=2^{-i}(2^{i-1}m_i+2^{i-2}m_{i-1}+\ldots+m_1)N$$
$$\cdots\cdots$$
$$P=X_{48}=\tfrac{1}{2}(m_{48}N+X_{47})=2^{-48}(2^{47}m_{48}+2^{46}m_{47}+\ldots+m_1)N=2^{-48}MN$$

and the product must be multiplied (or divided) by $2^{48}$ to give the correct answer modulo $2^{96}$. The number $X_i$ may be called the $i$th partial product and the number $m_iN$ the $i$th sub-multiple. Thus to form the $(i+1)$th partial product we add together the $i$th partial product and the $(i+1)$th sub-multiple and divide by two.

Further, to form the $(i+4)$th partial product $X_{i+4}$ we add together the $i$th partial product, the $i$th sub-multiple, twice the $(i+1)$th sub-multiple, four times the $(i+2)$th sub-multiple and eight times the $(i+3)$th sub-multiple, and divide the result by sixteen:

$$X_{i+4}=\tfrac{1}{16}(X_i+m_{i+1}N+2m_{i+2}N+4m_{i+3}N+8m_{i+4}N)$$

a result which is obtainable from the above by simple algebra. This equation expresses exactly what is done in the preferred embodiment of the present invention, which is described below.

According to the present invention there is provided a binary multiplier including an adder and a single-length multiplier store, and in which more than one copy of the product of the multiplicand and a multiplier digit is fed to the adder at one time and in which part of the output of the adder is fed to the multiplier store.

The notation used in the present specification is the well-known Turing notation as used and described in U.S. Patent No. 2,686,632 except that D-shaped symbols are used to indicate delays instead of the triangular ones described in that patent, since this is now the fashion in the art.

An embodiment of the invention will be described, by way of example, with reference to the accompanying drawings in which.

Figure 1:
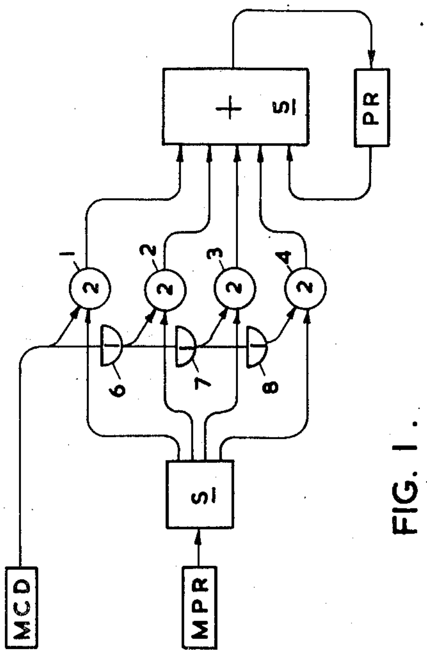
FIGURE 1 is a circuit diagram of the embodiment in the barest outline.

FIGURE 1 is a circuit diagram of the invention in the barest outline. The output of a 48-digit delay line MPR is applied to a staticisor S whose four outputs are fed to four separate AND-gates 1, 2, 3 and 4 whose outputs are fed to four separate inputs of a five-input adder 5. A suitable adder is fully described in copending patent application Serial No. 754,231 and filed August 11, 1958, by Charles Howard Davis and John Bentley Stringer. The output of the adder is applied to a 96-digit delay line PR, the output of which is applied to the fifth input of the adder. A third delay line MCD having a length of 48 digits is arranged so that its output feeds a cascade of three unit delays 6, 7 and 8. The outputs of the delay line MCD and the delays 6, 7 and 8 are separately applied to the four gates 1, 2, 3 and 4 respectively.

The operation of the circuit is as follows. The multiplicand is stored in the delay line MCD and the multiplier in the delay line MPR. Four digits of the multiplier are staticised by the staticisor S and enable the gates 1, 2, 3 and 4 to be opened or not according as each separately is a one or a zero. Thus four sub-multiples are allowed through the gates 1, 2, 3 and 4 and into the adder 5. It is well-known in the art that, in a serial binary computing engine where words emerge from tanks with the least significant digit leading, a unit delay, i.e. a one-digit delay, in a circuit will cause words flowing through the delay to be effectively multiplied by 2. Thus if the staticised multiplier digits applied to the gates 1, 2, 3 and 4 are adjacent and in order with the staticised digit of least significance applied to the gate 1, then the sub-multiples will arrive at the adder 5 properly timed, and the output will represent the sum of the number word which flows out of the product register PR and the four sub-multiples. It is most convenient to arrange the circuit so that the first four multiplier digits to be selected are the four least significant digits of the multiplier, so that the fourth partial product flows into the product register. Following this the next four significant multiplier digits can be selected, so that the word flowing out of the adder 5 (being the sum of the fourth partial product and the fifth, sixth, seventh and eighth sub-multiples) represents the eighth partial product. This process is continued until all the multiplier digits have been used, when the word emerging from the adder will represent the product.

In the foregoing description it has been assumed that the outputs of the three delay lines MPR, MCD and PR have been properly timed, and to ensure this use is made of various pulses which will be described next.

Figure 2:
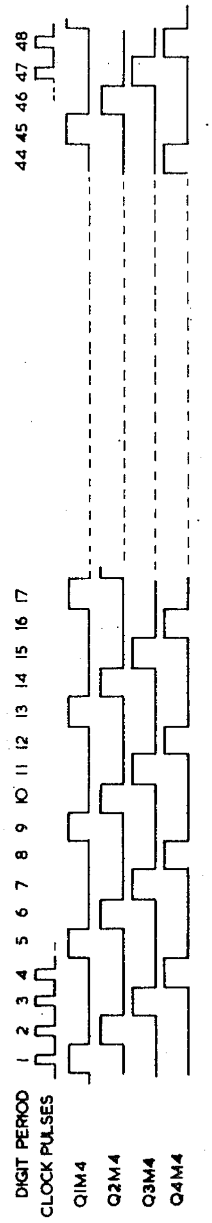
FIGURE 2 is a graph, plotted against time, of certain pulses used in the embodiment.

FIGURE 2 is a graph, plotted against time, of certain pulses used in the embodiment. Firstly there are shown the familiar clock pulses each occupying about one-third of a digit in the middle of each digit period. Forty-eight digit periods constitute a minor cycle, and the machine contains a counter which determines the start of each minor cycle; the digit periods are counted from the start of each minor cycle as determined by this counter. An isolated pulse in the $i$th digit period of a minor cycle in true engine time will be called a P$i$ pulse in the case where it occupies the middle third of the digit period but will be called a $Qi$ pulse in the case where it occupies the whole of the digit period. A "Q" pulse which recurs every fourth digit period may be regarded as a $Qi$ (modulo 4) pulse. This is written $Qi$M4 for short, and the four QM4 pulses Q1M4, Q2M4, Q3M4 and Q4M4 are shown in FIGURE 2.

Figure 3:
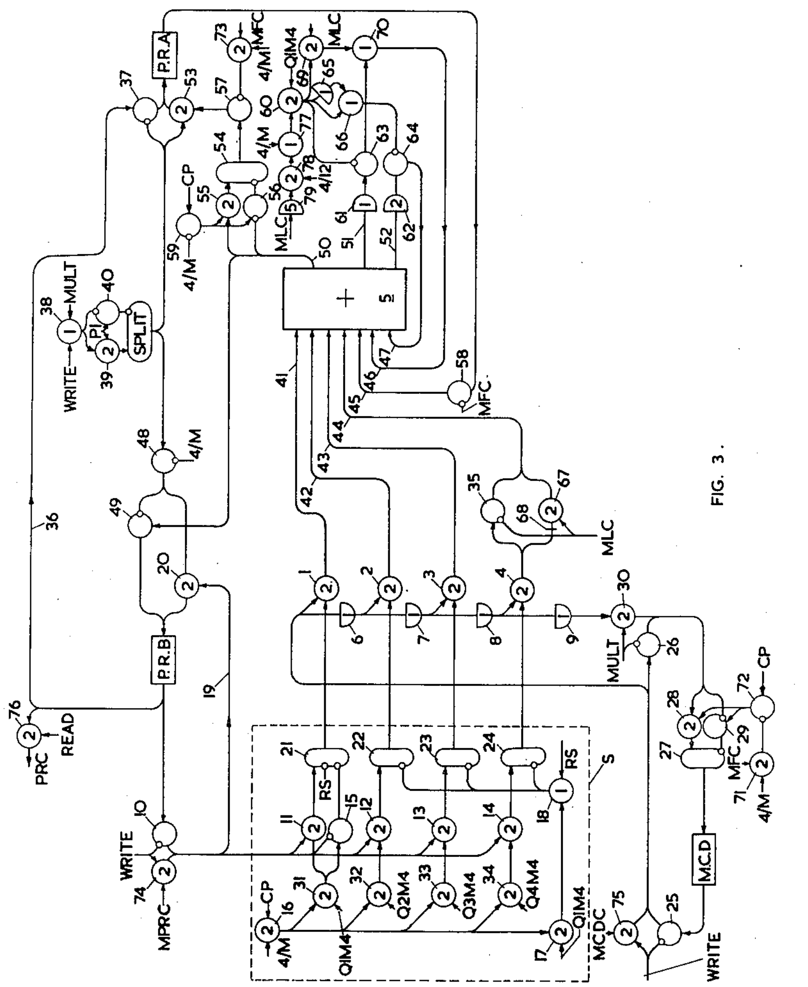
FIGURE 3 is a more complete circuit diagram of the embodiment.

FIGURE 3 is a more complete circuit diagram of the embodiment. The components of FIGURE 3 which correspond to those of FIGURE 1 have been similarly numbered and lettered. In this arrangement the 96-digit delay line, PR, of FIGURE 1 has been replaced by two separate 48-digit delay lines PRA and PRB for speed of operation. The latter delay line PRB holds the multiplier as well.

It will be remembered that in the case where the multiplicand and multiplier are each 48 digits long, then the product is 96 digits long, so that, in FIGURE 1, the delay lines MCD and MPR ought to have a length of 48 digits and the delay line PR a length of 96 digits. It will also be remembered that the number obtained in the delay line PR, which is the 48th partial product must be multiplied by $2^{48}$ to get the correct product. This is effected by adding the sub-multiples and the previous partial product to the more significant half of the partial product each time, instead of adding them to the less significant half as usual. Thus the result is the required product.

As stated above, the machine performs the equation.

$$X_{i+4}=\tfrac{1}{16}(X_i+m_{i+1}N+2m_{i+2}N+4m_{i+3}N+8m_{i+4}N)$$

and it does so by forming the five separate addends $X_i$, $m_{i+1}N$, $2m_{i+2}N$, $4m_{i+3}N$, $8m_{i+4}N$, adding them together and causing the result to be divided by sixteen. It is well-known in the art that in a binary digital computing engine multiplication and division of a word by a power of two is obtained simply by shifting the word by a number of digit positions, the number being the same as the power and the shift being in one direction or the other according as multiplication or division is called for. Thus the separate addends are formed by taking the multiplicand, shifted where necessary, when the relevant multiplier digit is a one, and taking nothing when the relevant multiplier digit is a zero. The sum, of course, when formed, will occupy more than 48 digit positions in the case where the multiplicand occupies the full 48 digits. It can easily be shown that in the worst possible case the sum will have 52 digits, of which some will be binary fraction digits. (By a binary fraction digit is meant a digit before the binary point in an analogous way to the description of a decimal fraction digit in the decimal scale of notation; the least significant digits are assumed to be written on the left.) In the $i$th sub-multiple, in fact, $i$ digits will be binary fraction digits.

The multiplier is timed in cycles, known as multiplication cycles, which last for 52 digit periods. In the first multiplication cycle the first four sub-multiples flow into the adder and emerge as the fourth partial product, in the second multiplication cycle the fifth, sixth, seventh and eighth sub-multiples and the fourth partial product flow into the adder and emerge as the eighth partial product and so on. A pulse which is needed for the process and which is known as the 4/M pulse occupies four whole digit periods at the beginning of each multiplication cycle; that is to say the 4/M pulse occupies the Q1, Q2, Q3 and Q4 times in the first minor cycle of true machine time, the Q5, Q6, Q7 and Q8 times in the second minor cycle of true machine time, and so on.

In the equation quoted above, and which is the equation performed by the machine, the division by sixteen is accomplished, in a manner familiar to those skilled in the art, by using a 48-digit word in a 52-digit circuit.

In the embodiment shown in FIGURE 3, four multiplier digits are always staticised during 4/M time. The multiplier digits flow from the delay line PRB, via an inhibiting gate 10, to four AND-gates 11, 12, 13 and 14 and to the inhibiting input of an inhibiting gate 15. The gate 10 is inhibited by a signal designated WRITE. The outputs of the gates 11, 12, 13 and 14 put on triggers 21, 22, 23 and 24 respectively, and the output of the gate 15 puts off the trigger 21. The other inputs of the gates 11, 12, 13 and 14 are the outputs of four AND-gates 31, 32, 33 and 34 respectively; and the gate 31 also provides the input of the inhibiting gate 15. The gates 31, 32, 33 and 34 are each fed from an AND-gate 16, whose two inputs are clock pulses and the 4/M pulse. In addition the gates 31, 32, 33 and 34 are each fed with the pulses Q1M4, Q2M4, Q3M4, and Q4M4 respectively. The output of the gate 16 is also applied to an AND-gate 17, whose other input is the Q1M4 pulse, and whose output puts off the triggers 22, 23 and 24 via an OR-gate 18. The OR-gate 18 has one further input, which is a signal called RS, which resets the triggers at the end of the whole process and which will be described below. The signal RS is arranged to put off the trigger 21. The triggers 21, 22, 23 and 24 and the gates 11, 12, 13, 14, 15, 16, 17, 18, 21, 22, 23, 24, 31, 32, 33 and 34 together with their interconnections constitute the staticisor S.

During most of the multiplication process the multiplier circulates along a channel 19 and via an AND-gate 20 which is normally open.

The operation of the staticisor is as follows. The gate 16 emits clock pulses during 4/M time, so that the gates 31, 32, 33 and 34 emit narrow Q1M4, Q2M4, Q3M4 and Q4M4 pulses respectively during 4/M time. In the first multiplication cycle the first digit to leave the delay line PRB leaves it at P1 time, at which time the gates 11 and 15 are activated. If this digit is a one, then the trigger 21 is put on, but if it is a zero then the trigger is put off. At P1 time the triggers 22, 23 and 24 are all put off by a clock pulse being let through the gate 16 at 4/M time, through the gate 17 at Q1M4 time and through the OR-gate 18. The gate 32 emits a pulse at P2 time, which opens the gate 12, and enables the second digit of the multiplier to put on the trigger 22 provided this digit is a one. Thus the trigger 22 is on when the P2 digit of the multiplier is a one, and off when this digit is a zero. Similarly the trigger 23 is put on when the P3 digit of the multiplier is a one but left off when this digit is a zero, and the trigger 24 is put on when the P4 digit of the multiplier is a one but left off when this digit is a zero.

The four triggers 21, 22, 23 and 24 remain in this condition until the next 4/M time, i.e., until the beginning of the next multiplication cycle. Since the multiplication cycle is 52 digits long and the delay line PRB is of 48 digits capacity the digits emerging from the delay line PRB will be the P5, P6, P7 and P8 digits of the multiplier. These digits will become staticised on the triggers 21, 22, 23 and 24 in exactly the same way as the P1, P2, P3 and P4 digits were previously, and so on; at the twelfth multiplication cycle the last four multiplier digits are staticised.

The 48-digit delay line MCD, which was described with reference to FIGURE 1, contains the multiplicand, whose normal circulation is via two inhibiting gates 25 and 26 to a pulse-widening trigger 27 and thence back to the delay line MCD. The gate 25 is inhibited by the signal WRITE, and the gate 26 is inhibited by a signal designated MULT. The output of the latter gate is applied to an AND-gate 28 and to the inhibiting input of an inhibiting gate 29. Clock pulses are normally applied to these two gates. When the digit appearing at the gates 28 and 29 is a one, then it opens the gate 28 and closes the gate 29 and allows a clock pulse to pass through the gate 28 and to put the trigger 27 on. When the digit is a zero it allows a clock pulse to pass through the gate 29 and to input the trigger 27 off. The trigger 27 thus widens the pulses. Of course, a certain delay is experienced due to this pulse-widening trigger, and this delay is made up by a corresponding shortening of the delay lines concerned, as described in copending patent application No. 281,603, filed April 10, 1952, now United States Patent No. 2,784,906, in the name of D. W. Davies.

Other pulse-widening triggers used in the embodiment, for example, at all the inputs of the adder, have been omitted for simplicity where they have no special significance per se.

The signal MULT is put on at the beginning of the first digit period of the first multiplication cycle, and it then opens an AND-gate 30 and closes the gate 26. The effect of this is to change the circulation path of the multiplicand to a path via the unit delays 6, 7 and 8, via another unit delay 9, to the gate 30 and thence to the pulse-widening trigger 27 via the gates 28 and 29, as before. Thus during the time that the MULT signal is active the circulation path of the multiplicand will be increased by four digits, that is to say, the first digit of the multiplicand will appear at the delay 6 every 52 digits, i.e. every multiplication cycle.

The gates 1, 2, 3, and 4 are separately opened by the triggers 21, 22, 23 and 24 respectively, and each gate, when open, allows a submultiple to flow through as described with reference to FIGURE 1. The outputs of the gates 1, 2 and 3 provide inputs 41, 42 and 43 respectively of the adder. The output of the gate 4 is applied to an input 44 of the adder via an inhibiting gate 35.

The gates 1, 2, 3 and 4 are, of course, opened (in the case where the relevant digits are ones) at the first, second, third and fourth digit times respectively of the relevant multiplication cycle, and the leading digit of the multiplicand arrives at the gates at exactly the same time, so that each gate is conditioned just as the multiplicand reaches it.

The two delay lines, PRA and PRB, which together constitute the product register, are joined by a channel 36 via an inhibiting gate 37. This channel is not used during the multiplication process proper, however, and is blocked at the gate 37 in a manner to be described. An OR-gate 38 has the WRITE and MULT signals fed to it, and its output is applied to an AND-gate 39 and to the inhibiting input of an inhibiting gate 40. Each of these gates is fed with a P1 pulse. The gate 39 is arranged to put on a trigger SPLIT, and the gate 40 to put the trigger SPLIT off. Thus the SPLIT trigger is put on or held on by all P1 pulses appearing during the time that either the WRITE or the MULT signal is on, and is put off or held off by all P1 pulses appearing when both the WRITE and the MULT signals are off.

The signal from the SPLIT trigger inhibits the gate 37 but opens an AND-gate 53 whose output is applied to the delay line PRA. The SPLIT trigger output is also applied to an inhibiting gate 48, inhibited by the 4/M signal, and thence to the AND-gate 20 and to the inhibiting input of an inhibiting gate 49, the output of the last two gates being applied to the delay line PRB.

The output of the adder 5 which represents the sum (as opposed to the carry) of the inputs is labelled 50, and is applied to the gate 49 and to a pulse-widening trigger 54 which is put on by block pulses via an AND-gate 55 when the digit flowing from the output 50 of the adder 5 is a one and which is put off by clock pulses via an inhibiting gate 56 when the said digit is a zero. This pulse-widening trigger works in a similar way to the trigger 27. The clock-pulses are, however, interrupted during 4/M time at an inhibiting gate 59. Its output is applied to the gate 53 via an inhibiting gate 57.

The output of the delay line PRA is applied, via an inhibiting gate 58, to an input 45 of the adder 5.

The main part of the circuit having been described, an account will be given of its operation. As has already been described, sub-multiples are generated via the gates 1, 2, 3 and 4 on the inputs 41, 42, 43 and 44 of the adder 5. In the first multiplication cycle there is no partial product to be added to the sub-multiples and so no signals appear on the input channel 45 of the adder. As explained above, the fourth partial product emerges from the adder 5 on the channel 50. This partial product will start to emerge at the beginning of 4/M time. Clock pulses are not supplied to the pulse widening trigger 54 during 4/M time due to the inhibition by the 4/M signal of the gate 59. So the partial product will not affect the trigger 54 and will not be communicated to the delay line PRA during 4/M time. However, the 4/M signal at the gate 48 prevents the signal from the SPLIT trigger inhibiting the gate 49 and opening the gate 48 so that the digits emerging from the adder 5 on the channel 50 during 4/M time (that is, the first four digits of the multiplicand) will be sent to the delay line PRB via the gate 49. These digits are of course the fractional part of the sub-multiple referred to above. To make room for the digits the four digits emerging from the delay line PRB via the channel 19 at 4/M time will be lost at the gate 20. These are the same digits as those that are staticised in the staticisor S during this multiplication cycle, and are not required afterwards. At the conclusion of the 4/M signal the gates 48 and 59 are re-opened, allowing the trigger SPLIT to close the gate 49 and to open the gate 20, and allowing clock pulses to the gates 55 and 56. Thus the remaining 48 digits of the partial product are allowed into the delay line PRA via the pulse widening trigger 54 and the gates 57 and 53.

The contents of this delay line will begin to emerge 48 digits later, that is, at the beginning of the next multiplication cycle. So the least significant digit of the contents of the delay line will arrive at the adder 5 via the input 45 at the same time as the least significant digit of the product of the multiplicand and the staticised fifth digit of the multiplier reaches the adder 5 via the gate 1 and the input 41. In this way the eighth partial product is formed, the least significant four digits of which are already in the delay line PRB, the four next more significant digits of which are sent to the delay line PRB during the second 4/M time in precisely the same way, and the remaining 48 digits of which are sent to the delay line PRA.

This process is repeated during subsequent multiplication cycles until the whole of the product is generated, the more significant half being in the delay line PRA and the less significant half in the delay line PRB.

Figure 4:
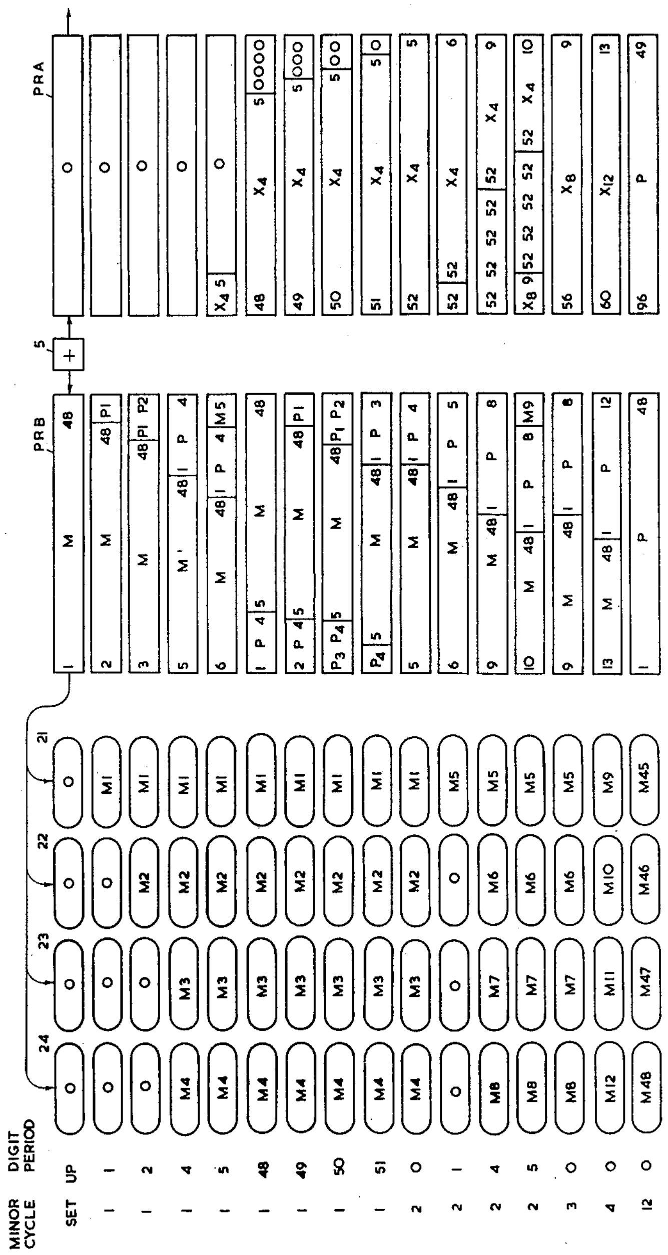
FIGURE 4 is a diagrammatic illustration of the contents of various registers at various times during the multiplication process.

FIGURE 4 is a diagrammatic illustration of the contents of the delay lines PRA and PRB and of the staticisor S at various times during the multiplication process. In this illustration M1, M2, . . . , M48 represent the multiplier digits, and P1, P2, . . . , P96 represent the product digits. The *i*th partial product digits are represented by $X_i1$, $X_i2$, . . . , $X_i(i+48)$, with the exception of the *i* least significant digits, which are represented by P1, P2, . . . , P*i*, as explained below. These digits as stated above are the fractional part of the partial product. M1, P1 and $X_1 1$ are the least significant digits.

The top line of the diagram names the delay lines and triggers and shows the interconnections. It also shows their contents just before the first multiplication cycle. The triggers are all off, the delay line PRA is empty and the delay line PRB contains the multiplier. The first multiplicand digit is about to be applied to the gate 1 of FIGURE 3. One digit period later, the M1 digit is staticised on the trigger 21 and the product of this digit with the least significant multiplicand digit is sent to the delay line PRB where it appears as P1. The M1 digit flows along the channel 19 but is lost at the gate 20. At the end of the second digit period the M2 digit has been staticised on the trigger 22 and the P2 digit has been sent to the delay line PRB. And so on until at the end of the fourth digit period when the M1, M2, M3 and M4 digits have all been staticised and the P1, P2, P3 and P4 digits have all arrived at the delay line PRB. At this time the 4/M pulse, which has been on since the beginning of the multiplication cycle, goes off, and the next digit to emerge from the adder 5 on the channel 50 is sent to the delay line PRA. This digit is, of course, the digit $X_4 5$. Meanwhile the gate 48 has been re-opened by the going off of the 4/M signal, allowing the SPLIT trigger to open the AND-gate 20. This just in time to allow the M5 digit to be stored in the delay line PRB. During subsequent digit periods the partial product builds up in the PRA register and the remainder of the multiplicand circulate in the PRB register. At the end of the forty-eighth digit period the position will be as shown, with the P1 digit about to emerge from the delay line PRB. The situation is shown from this time until the end of the multiplication cycle at the end of the fifty-second digit period, which can be regarded as the noughth digit period of the second multiplication cycle. It is at the end of this digit period that the 4/M pulse becomes operative once more, and the digits P5, P6, P7 and P8 successively are sent to the delay line PRB. The M5, M6, M7 and M8 digits are staticised during this time, and since the 4/M pulse inhibits clock pulses at the gate 59 the trigger 54 gives out copies of the $X_4 52$ digit until the first digit period after the end of the 4/M pulse, i.e. the fifth digit period, when $X_8 9$ will be sent to the delay line PRA. This process continues until the end of the eleventh multiplication cycle, when the product will be finally formed and distributed between the two delay lines as shown. At the end of the 52nd digit period of this multiplication cycle the MULT signal goes off allowing a P1 pulse to put the SPLIT trigger off via the gate 40, and the RS signal comes on, clearing the triggers 21, 22, 23 and 24.

No account so far has been taken of four aspects of the circuit, namely the carry suppression, the sign corrections, the means for reading into and out of the circuit, and the clearing and resetting means. These will be dealt with now.

A binary adder with just one carry output will only accommodate three inputs since four inputs might produce the number four, or 100 in binary notation, which yields a sum digit and two carry digits. Hence only two proper inputs (i.e. inputs which are not carry inputs from a previous operation) can be accommodated in an adder using one carry. The other input will of course be the carry input. Similarly, a binary adder with just two carry outputs will accommodate seven inputs of which two are of necessity carry inputs and the remaining five proper inputs.

The adder 5 therefore has two carry outputs. These are labelled 51 and 52, of which the output 51 is the one-place carry and the output 52 is the two-place carry. The outputs 51 and 52 are applied to delays 61 and 62 respectively, of which the delay 61 is a unit delay and the delay 62 a two-unit delay. The outputs of the delays 61 and 62 are applied to inputs 46 and 47 of the adder 5 via inhibiting gates 63 and 64 respectively. Between the gate 63 and the input 46 there is disposed a buffer 70.

Each addition is complete at the end of a multiplication cycle and for this purpose the carries at Q1M4 and Q2M4 during 4/M time must be suppressed. This is achieved by an AND-gate 60 which is fed with the 4/M and Q1M4 signals. The 4/M signals are applied via a buffer 77. The output of the gate is arranged to inhibit the gate 63 and the gate via a buffer 66. The output delayed one digit by a unit delay 65 is also applied to the buffer 66. Thus both carry digits are suppressed at Q1M4 time during the 4/M pulse, and the two-digit carry is suppressed one digit later by virtue of the delay 65, which is the required effect.

Additionally, at the end of the multiplication process as a whole, all carry digits must be suppressed. This must happen during the last four digit periods of the process. For this reason a long pulse which lasts for the duration of the last multiplication cycle and which is termed the MLC signal is generated. The MLC signal is gated with a signal composed of the Q45, Q46, Q47 and Q48 signals and called the 4/12 signal at a gate 78 and is applied to the gate 60 via the buffer 77 in the same way as the 4/M pulse above. However since the MLC signal, being 52 digit periods long, is on during two separate 4/12 signals it must be delayed for at least four digit periods for the carry suppression to be at the right time. This is done by a delay 79.

A convention which is frequently used in binary digital computers with regard to algebraical signs is the convention known as the complement convention. It often happens in serial binary digital computers in which the least significant digits emerge first from registers and in which this convention applies that a positive number is required to be followed by a series of zeros; it is well-known in the art that, under these circumstances a negative number must be followed by a series of ones. In fact, its sign digit must be repeated.

This situation obtains, of course, in the circulation path of the multiplicand which is fifty-two digits long. The sign digit is repeated by preventing the arrival of clock pulses at the gates 28 and 29 at a suitable time. This is achieved by the provision of an AND-gate 71 whose inputs are the 4/M signal and a signal called MFC which is on for the duration of the first multiplication cycle. That is, this signal comes on at the beginning of the first 4/M pulse and goes off at the beginning of the second 4/M pulse. The output of the gate 71 is applied to the inhibiting input of an inhibiting gate 72. Clock pulses are applied to this gate, and its output is applied to the gates 28 and 29.

The multiplicand starts to emerge from the delay line MCD during the first digit period of the first multiplication cycle, so that in the digit period preceding this one the last digit, i.e. the sign digit, will be on the point of entering the tank, and the trigger 27 will be off or on according as that digit is a zero or a one. During the next four digit periods the clock pulses will be prevented from altering the state of the trigger 27 so that the sign digit will be copied until the clock pulses begin to arrive at the gates 28 and 29 again, which is, of course, the time when the first digit will be emerging from the delay 9.

This facility is required also in the circulation path of the partial product. The only difference is that each partial product must have its sign digit repeated. This is achieved at the gate 59 where the clock pulses are inhibited at 4/M time during each multiplication cycle. During this 4/M time, the digits emerging from the adder 5 via the output channel 50 will be sent to the delay line PRB, and, in fact, the "fill-in" digits generated by the trigger 54 during 4/M time will emerge at the end of the multiplication cycle as the most significant digits of the partial product. Thus the partial product overlaps itself, so to speak, at 4/M time.

Those skilled in the art will be well acquainted with the fact that when the multiplier is negative the sub-multiple generated by the sign digit of the multiplier must be subtracted instead of added. This is achieved in the embodiment of FIGURE 3 by means of the MLC signal. The output of the gate 4 is connected to the input 44 of the adder 5 via the inhibiting gate 35, as already described. The output of the gate 4, complemented by an inverter 68, is connected to the input 44 of the adder 5 via an AND-gate 67. The MLC signal is applied to the gate 67 and to the inhibiting input of the gate 35. The MLC signal is also applied to an AND-gate 69 whose other input comes from the gate 60 and whose output is applied to the buffer 70.

It is well known in the art that a subtraction may be effected by the addition of the complement of the subtrahend to the minuend plus one, and in the present embodiment this works out as follows.

In the case where the multiplier is negative, the sign digit, i.e. the digit staticised on the trigger 24 will open the gate 4 and allow the multiplicand to flow through this gate to the gates 35 and 67. The MLC signal closes the gate 35 and opens the gate 67, so that the complement of the multiplicand will flow into the adder 5 via the input 44. As described above, the gate 60 emits Q1M4 pulses at 4/M time, and so the gate 69 will emit a one during Other pulse-widening triggers used in the embodiment, for example, at all the inputs of the adder, have been omitted for simplicity where they have no special significance per se.

The signal MULT is put on at the beginning of the first digit period of the first multiplication cycle, and it then opens an AND-gate 30 and closes the gate 26. The effect of this is to change the circulation path of the multiplicand to a path via the unit delays 6, 7 and 8, via another unit delay 9, to the gate 30 and thence to the pulse-widening trigger 27 via the gates 28 and 29, as before. Thus during the time that the MULT signal is active the circulation path of the multiplicand will be increased by four digits, that is to say, the first digit of the multiplicand will appear at the delay 6 every 52 digits, i.e. every multiplication cycle.

The gates 1, 2, 3, and 4 are separately opened by the triggers 21, 22, 23 and 24 respectively, and each gate, when open, allows a submultiple to flow through as described with reference to FIGURE 1. The outputs of the gates 1, 2 and 3 provide inputs 41, 42 and 43 respectively of the adder. The output of the gate 4 is applied to an input 44 of the adder via an inhibiting gate 35.

The gates 1, 2, 3 and 4 are, of course, opened (in the case where the relevant digits are ones) at the first, second, third and fourth digit times respectively of the relevant multiplication cycle, and the leading digit of the multiplicand arrives at the gates at exactly the same time, so that each gate is conditioned just as the multiplicand reaches it.

The two delay lines, PRA and PRB, which together constitute the product register, are joined by a channel 36 via an inhibiting gate 37. This channel is not used during the multiplication process proper, however, and is blocked at the gate 37 in a manner to be described. An OR-gate 38 has the WRITE and MULT signals fed to it, and its output is applied to an AND-gate 39 and to the inhibiting input of an inhibiting gate 40. Each of these gates is fed with a P1 pulse. The gate 39 is arranged to put on a trigger SPLIT, and the gate 40 to put the trigger SPLIT off. Thus the SPLIT trigger is put on or held on by all P1 pulses appearing during the time that either the WRITE or the MULT signal is on, and is put off or held off by all P1 pulses appearing when both the WRITE and the MULT signals are off.

The signal from the SPLIT trigger inhibits the gate 37 but opens an AND-gate 53 whose output is applied to the delay line PRA. The SPLIT trigger output is also applied to an inhibiting gate 48, inhibited by the 4/M signal, and thence to the AND-gate 20 and to the inhibiting input of an inhibiting gate 49, the output of the last two gates being applied to the delay line PRB.

The output of the adder 5 which represents the sum (as opposed to the carry) of the inputs is labelled 50, and is applied to the gate 49 and to a pulse-widening trigger 54 which is put on by block pulses via an AND-gate 55 when the digit flowing from the output 50 of the adder 5 is a one and which is put off by clock pulses via an inhibiting gate 56 when the said digit is a zero. This pulse-widening trigger works in a similar way to the trigger 27. The clock-pulses are, however, interrupted during 4/M time at an inhibiting gate 59. Its output is applied to the gate 53 via an inhibiting gate 57.

The output of the delay line PRA is applied, via an inhibiting gate 58, to an input 45 of the adder 5.

The main part of the circuit having been described, an account will be given of its operation. As has already been described, sub-multiples are generated via the gates 1, 2, 3 and 4 on the inputs 41, 42, 43 and 44 of the adder 5. In the first multiplication cycle there is no partial product to be added to the sub-multiples and so no signals appear on the input channel 45 of the adder. As explained above, the fourth partial product emerges from the adder 5 on the channel 50. This partial product will start to emerge at the beginning of 4/M time. Clock pulses are not supplied to the pulse widening trigger 54 during 4/M time due to the inhibition by the 4/M signal of the gate 59. So the partial product will not affect the trigger 54 and will not be communicated to the delay line PRA during 4/M time. However, the 4/M signal at the gate 48 prevents the signal from the SPLIT trigger inhibiting the gate 49 and opening the gate 48 so that the digits emerging from the adder 5 on the channel 50 during 4/M time (that is, the first four digits of the multiplicand) will be sent to the delay line PRB via the gate 49. These digits are of course the fractional part of the sub-multiple referred to above. To make room for the digits the four digits emerging from the delay line PRB via the channel 19 at 4/M time will be lost at the gate 20. These are the same digits as those that are staticised in the staticisor S during this multiplication cycle, and are not required afterwards. At the conclusion of the 4/M signal the gates 48 and 59 are re-opened, allowing the trigger SPLIT to close the gate 49 and to open the gate 20, and allowing clock pulses to the gates 55 and 56. Thus the remaining 48 digits of the partial product are allowed into the delay line PRA via the pulse widening trigger 54 and the gates 57 and 53.

The contents of this delay line will begin to emerge 48 digits later, that is, at the beginning of the next multiplication cycle. So the least significant digit of the contents of the delay line will arrive at the adder 5 via the input 45 at the same time as the least significant digit of the product of the multiplicand and the staticised fifth digit of the multiplier reaches the adder 5 via the gate 1 and the input 41. In this way the eighth partial product is formed, the least significant four digits of which are already in the delay line PRB, the four next more significant digits of which are sent to the delay line PRB during the second 4/M time in precisely the same way, and the remaining 48 digits of which are sent to the delay line PRA.

This process is repeated during subsequent multiplication cycles until the whole of the product is generated, the more significant half being in the delay line PRA and the less significant half in the delay line PRB.

FIGURE 4 is a diagrammatic illustration of the contents of the delay lines PRA and PRB and of the staticisor S at various times during the multiplication process. In this illustration M1, M2, . . . , M48 represent the multiplier digits, and P1, P2, . . . , P96 represent the product digits. The *i*th partial product digits are represented by $X_i1$, $X_i2$, . . . , $X_i(i+48)$, with the exception of the *i* least significant digits, which are represented by P1, P2, . . . , P*i*, as explained below. These digits as stated above are the fractional part of the partial product. M1, P1 and $X_i1$ are the least significant digits.

The top line of the diagram names the delay lines and triggers and shows the interconnections. It also shows their contents just before the first multiplication cycle. The triggers are all off, the delay line PRA is empty and the delay line PRB contains the multiplier. The first multiplicand digit is about to be applied to the gate 1 of FIGURE 3. One digit period later, the M1 digit is staticised on the trigger 21 and the product of this digit with the least significant multiplicand digit is sent to the delay line PRB where it appears as P1. The M1 digit flows along the channel 19 but is lost at the gate 20. At the end of the second digit period the M2 digit has been staticised on the trigger 22 and the P2 digit has been sent to the delay line PRB. And so on until at the end of the fourth digit period when the M1, M2, M3 and M4 digits have all been staticised and the P1, P2, P3 and P4 digits have all arrived at the delay line PRB. At this time the 4/M pulse, which has been on since the beginning of the multiplication cycle, goes off, and the next digit to emerge from the adder 5 on the channel 50 is sent to the delay line PRA. This digit is, of course, the digit $X_45$. Meanwhile the gate 48 has been re-opened by the going off of the 4/M signal, allowing the SPLIT trigger to open the AND-gate 20. This just in time to allow the M5 digit to be stored in the delay line PRB. During subsequent digit periods the partial product builds up in the PRA register and the remainder of the multiplicand circulate in the PRB register. At the end of the forty-eighth digit period the position will be as shown, with the P1 digit about to emerge from the delay line PRB. The situation is shown from this time until the end of the multiplication cycle at the end of the fifty-second digit period, which can be regarded as the noughth digit period of the second multiplication cycle. It is at the end of this digit period that the 4/M pulse becomes operative once more, and the digits P5, P6, P7 and P8 successively are sent to the delay line PRB. The M5, M6, M7 and M8 digits are staticised during this time, and since the 4/M pulse inhibits clock pulses at the gate 59 the trigger 54 gives out copies of the $X_4 52$ digit until the first digit period after the end of the 4/M pulse, i.e. the fifth digit period, when $X_8 9$ will be sent to the delay line PRA. This process continues until the end of the eleventh multiplication cycle, when the product will be finally formed and distributed between the two delay lines as shown. At the end of the 52nd digit period of this multiplication cycle the MULT signal goes off allowing a P1 pulse to put the SPLIT trigger off via the gate 40, and the RS signal comes on, clearing the triggers 21, 22, 23 and 24.

No account so far has been taken of four aspects of the circuit, namely the carry suppression, the sign corrections, the means for reading into and out of the circuit, and the clearing and resetting means. These will be dealt with now.

A binary adder with just one carry output will only accommodate three inputs since four inputs might produce the number four, or 100 in binary notation, which yields a sum digit and two carry digits. Hence only two proper inputs (i.e. inputs which are not carry inputs from a previous operation) can be accommodated in an adder using one carry. The other input will of course be the carry input. Similarly, a binary adder with just two carry outputs will accommodate seven inputs of which two are of necessity carry inputs and the remaining five proper inputs.

The adder 5 therefore has two carry outputs. These are labelled 51 and 52, of which the output 51 is the one-place carry and the output 52 is the two-place carry. The outputs 51 and 52 are applied to delays 61 and 62 respectively, of which the delay 61 is a unit delay and the delay 62 a two-unit delay. The outputs of the delays 61 and 62 are applied to inputs 46 and 47 of the adder 5 via inhibiting gates 63 and 64 respectively. Between the gate 63 and the input 46 there is disposed a buffer 70.

Each addition is complete at the end of a multiplication cycle and for this purpose the carries at Q1M4 and Q2M4 during 4/M time must be suppressed. This is achieved by an AND-gate 60 which is fed with the 4/M and Q1M4 signals. The 4/M signals are applied via a buffer 77. The output of the gate is arranged to inhibit the gate 63 and the gate via a buffer 66. The output delayed one digit by a unit delay 65 is also applied to the buffer 66. Thus both carry digits are suppressed at Q1M4 time during the 4/M pulse, and the two-digit carry is suppressed one digit later by virtue of the delay 65, which is the required effect.

Additionally, at the end of the multiplication process as a whole, all carry digits must be suppressed. This must happen during the last four digit periods of the process. For this reason a long pulse which lasts for the duration of the last multiplication cycle and which is termed the MLC signal is generated. The MLC signal is gated with a signal composed of the Q45, Q46, Q47 and Q48 signals and called the 4/12 signal at a gate 78 and is applied to the gate 60 via the buffer 77 in the same way as the 4/M pulse above. However since the MLC signal, being 52 digit periods long, is on during two separate 4/12 signals it must be delayed for at least four digit periods for the carry suppression to be at the right time. This is done by a delay 79.

A convention which is frequently used in binary digital computers with regard to algebraical signs is the convention known as the complement convention. It often happens in serial binary digital computers in which the least significant digits emerge first from registers and in which this convention applies that a positive number is required to be followed by a series of zeros; it is well-known in the art that, under these circumstances a negative number must be followed by a series of ones. In fact, its sign digit must be repeated.

This situation obtains, of course, in the circulation path of the multiplicand which is fifty-two digits long. The sign digit is repeated by preventing the arrival of clock pulses at the gates 28 and 29 at a suitable time. This is achieved by the provision of an AND-gate 71 whose inputs are the 4/M signal and a signal called MFC which is on for the duration of the first multiplication cycle. That is, this signal comes on at the beginning of the first 4/M pulse and goes off at the beginning of the second 4/M pulse. The output of the gate 71 is applied to the inhibiting input of an inhibiting gate 72. Clock pulses are applied to this gate, and its output is applied to the gates 28 and 29.

The multiplicand starts to emerge from the delay line MCD during the first digit period of the first multiplication cycle, so that in the digit period preceding this one the last digit, i.e. the sign digit, will be on the point of entering the tank, and the trigger 27 will be off or on according as that digit is a zero or a one. During the next four digit periods the clock pulses will be prevented from altering the state of the trigger 27 so that the sign digit will be copied until the clock pulses begin to arrive at the gates 28 and 29 again, which is, of course, the time when the first digit will be emerging from the delay 9.

This facility is required also in the circulation path of the partial product. The only difference is that each partial product must have its sign digit repeated. This is achieved at the gate 59 where the clock pulses are inhibited at 4/M time during each multiplication cycle. During this 4/M time, the digits emerging from the adder 5 via the output channel 50 will be sent to the delay line PRB, and, in fact, the "fill-in" digits generated by the trigger 54 during 4/M time will emerge at the end of the multiplication cycle as the most significant digits of the partial product. Thus the partial product overlaps itself, so to speak, at 4/M time.

Those skilled in the art will be well acquainted with the fact that when the multiplier is negative the sub-multiple generated by the sign digit of the multiplier must be subtracted instead of added. This is achieved in the embodiment of FIGURE 3 by means of the MLC signal. The output of the gate 4 is connected to the input 44 of the adder 5 via the inhibiting gate 35, as already described. The output of the gate 4, complemented by an inverter 68, is connected to the input 44 of the adder 5 via an AND-gate 67. The MLC signal is applied to the gate 67 and to the inhibiting input of the gate 35. The MLC signal is also applied to an AND-gate 69 whose other input comes from the gate 60 and whose output is applied to the buffer 70.

It is well known in the art that a subtraction may be effected by the addition of the complement of the subtrahend to the minuend plus one, and in the present embodiment this works out as follows.

In the case where the multiplier is negative, the sign digit, i.e. the digit staticised on the trigger 24 will open the gate 4 and allow the multiplicand to flow through this gate to the gates 35 and 67. The MLC signal closes the gate 35 and opens the gate 67, so that the complement of the multiplicand will flow into the adder 5 via the input 44. As described above, the gate 60 emits Q1M4 pulses at 4/M time, and so the gate 69 will emit a one during the first digit period of the last multiplication cycle. This is sent to the adder 5 via the buffer 70 and the carry input 46. This input is not being used at the time because of the carry suppression described above. Thus the multiplicand is subtracted as required.

In the case where the multiplier is positive, the gate 4 will be closed, not allowing the multiplicand to flow into the adder 5 from the delay 8. During the last cycle of multiplication the gate 35 will be closed and the gate 67 open as before, so that the negating device 68 will emit a series of ones, which will go to the adder 5 via the input 44. This will make the product incorrect unless a further one is added in during the first digit period of the multiplication cycle. This is, of course, provided as before from the gate 69. This can be seen more clearly when the series of ones is regarded as the complement of zero, and thus zero will be subtracted, leaving the product as it should be.

The means for writing the multiplier and for writing the multiplicand and the means for reading the product can conveniently be as follows. An AND-gate 74 has inputs from a multiplier channel MPRC and the WRITE signal and has an output to the gates 11, 12, 13, 14 and 15 and to the channel 19. In the same way a gate 75 has inputs from a multiplicand channel MCDC and the WRITE signal and has an output to the gates 1 and 26 and to the delay 6. The WRITE signal is also applied to the buffer 38 and to the inhibiting inputs of the gates 10 and 25 as described above. An output of the delay line PRB is applied to an AND-gate 76 whose other input is a READ signal and whose output is a product channel PRC.

The WRITE signal can conveniently occupy the minor cycle (i.e. 48 digit periods) previous to the first multiplication cycle. It will put on the trigger SPLIT via the gates 38 and 39 at P1 time, thus opening the gate 20 and closing the gate 49. It will open the gate 74 and close the gate 10, allowing the multiplier to flow into the delay line PRB via the gate 74, the channel 19 and the gate 20. It will open the gate 75 and close the gate 25, allowing the multiplicand to flow into the delay line MCD via the gates 75, 26, 28 and 29 and the trigger 27.

At the conclusion of the multiplication process the SPLIT trigger is, of course, off, and the product will circulate between the delay lines PRA and PRB via the channel 36 and the gate 37 and back via the gate 58, the channel 45, the adder 5, the channel 50 and the gate 49. The soonest possible time to extract the product is at the end of the last multiplication cycle, when it may be done by applying a READ signal to the gate 76 when the product will flow out on the product channel PRC.

The machine is reset at the end of the multiplication process by the application of a reset pulse RS to the buffer 18 and to the "off" connection of the trigger 21, which will put off the triggers 21, 22, 23 and 24. Thus the staticisor will be cleared. The delay lines PRB and MCD are cleared when they are written into, and the tank PRA is cleared during the first multiplication cycle by the application of the MFC signal to the inhibiting input of the gate 58. The trigger 54 may remain on during 4/M time in the first multiplication cycle if the last digit to be applied to the trigger was a one. These extra digits are wiped out at the gate 57 by means of an AND-gate 73 whose inputs are the 4/M and MFC signals whose output is applied in the inhibiting input of the inhibiting gate 57.

The various pulses described herein may be produced in a manner well-known to those skilled in the art by gates, triggers and ring counters, for example, as particularly described in U.S. Patent No. 2,686,632 and U.S. Patent No. 2,799,449.

It will be obvious to those familiar with the art that although the embodiment described relates to a computing engine with a word-length of 48 digits the present invention can be applied to a computing engine with different word-lengths. Similarly, although in the embodiment described four multiplier digits are taken at a time, this is not of the essence of the invention, and those skilled in the art will be able readily to devise corresponding embodiments in which different multiplier digits are chosen.

I claim:

1. A binary multiplier including means for feeding multiplicand digit signals to at least two AND-gates and in which a single-length multiplier store is connected to the said at least two AND-gates and the said at least two AND-gates are connected to a multi-input adder the output of which is connected part of the time to the multiplier store and part of the time to a single-length product store.

2. A binary multiplier as claimed in claim 1 and in which the part of the time during which the output of the adder is connected to the multiplier store is that time during which the least significant digit signals are emerging from the adder, the number of digit signals being the same as the number of AND-gates in the said at least two AND-gates.

3. A binary multiplier as claimed in claim 2 and in which the said means for feeding multiplicand digit signals to the said at least two AND-gates includes a cascade of one-digit delays.

References Cited in the file of this patent

UNITED STATES PATENTS

| | | |
|---|---|---|
| 2,749,037 | Stibitz | June 5, 1956 |
| 2,786,628 | Kilburn | Mar. 26, 1957 |
| 2,789,760 | Rey et al. | Apr. 23, 1957 |
| 2,846,142 | Strachey et al. | Aug. 5, 1958 |
| 2,863,604 | Leclerc et al. | Dec. 9, 1958 |
| 2,867,380 | Piel et al. | Jan. 6, 1959 |